(12) United States Patent
Cevik et al.

(10) Patent No.: US 11,441,605 B1
(45) Date of Patent: Sep. 13, 2022

(54) DUAL-FILM DAMPER

(71) Applicant: PRATT & WHITNEY CANADA CORP., Longueuil (CA)

(72) Inventors: Mert Cevik, Boucherville (CA); Philip A. Varney, Coventry, CT (US); Robert J. Morris, Jasper, GA (US); David Beamish, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/188,249

(22) Filed: Mar. 1, 2021

(51) Int. Cl.
*F16C 27/04* (2006.01)
*F01D 25/16* (2006.01)
*F16F 15/023* (2006.01)

(52) U.S. Cl.
CPC .......... *F16C 27/045* (2013.01); *F01D 25/164* (2013.01); *F16F 15/0237* (2013.01); *F16C 2360/23* (2013.01)

(58) Field of Classification Search
CPC .... F16C 27/045; F01D 25/164; F16F 15/0237
See application file for complete search history.

(56) References Cited

U.S. PATENT DOCUMENTS

| | | | |
|---|---|---|---|
| 3,304,802 A | 2/1967 | Kofink | |
| 3,499,691 A | 3/1970 | Baier | |
| 4,214,796 A | 7/1980 | Monzel et al. | |
| 4,289,360 A | 9/1981 | Zirin | |
| RE31,394 E | 9/1983 | Streifert | |
| 4,527,910 A | 7/1985 | Fleming | |
| 4,992,024 A | 2/1991 | Heydrich | |
| 5,071,262 A | 12/1991 | Monzel et al. | |
| 5,207,511 A | 5/1993 | Bobo | |
| 5,228,784 A | 7/1993 | Bobo | |
| 5,316,391 A * | 5/1994 | Monzel ................. | F16C 27/045 384/99 |
| 8,342,796 B2 | 1/2013 | Spencer et al. | |
| 9,841,056 B2 * | 12/2017 | Snow .................... | F16C 27/045 |
| 9,879,750 B2 | 1/2018 | Husband et al. | |
| 10,077,713 B2 | 9/2018 | Gysling et al. | |
| 10,233,778 B2 | 3/2019 | Gysling et al. | |
| 10,808,755 B2 * | 10/2020 | Veitch ................. | F16F 15/0237 |
| 10,954,817 B2 * | 3/2021 | Ivakitch ............... | F01D 25/164 |
| 2003/0007705 A1 | 1/2003 | Bosen et al. | |
| 2004/0062460 A1 | 4/2004 | Dusserre-Telmon et al. | |
| 2009/0263057 A1 | 10/2009 | Kanki et al. | |
| 2011/0058759 A1 | 3/2011 | Herborth et al. | |
| 2016/0040554 A1 | 2/2016 | Hovhannisian et al. | |
| 2018/0128124 A1 | 5/2018 | Avis et al. | |

* cited by examiner

*Primary Examiner* — James Pilkington
(74) *Attorney, Agent, or Firm* — Norton Rose Fulbright Canada LLP.

(57) ABSTRACT

A dual-film damper has a housing defining an annular damper fluidly connected to a source of pressurized oil. First and second damper rings are coaxially nested within the damper cavity. A first set of spacers allows for the formation of a first oil film annulus between the first and second damper rings. A second set of spacers allows for the formation of a second oil film annulus between the second damper ring and the housing. The first and second oil film annuli have a thickness-to-length ratio (T/L) selected to provide a desired damping capacity.

20 Claims, 2 Drawing Sheets

DUAL-FILM DAMPER

TECHNICAL FIELD

The disclosure relates to dampers for reducing vibrations in a rotor system and, more particularly, to squeeze film dampers.

BACKGROUND

Squeeze film dampers with a single oil film are well known and used throughout the gas turbine and turbomachinery industry. They are typically placed in series with the rotor system bearing supports to reduce vibrations that would otherwise be present in the system. In some instances (i.e. high rotor unbalance), a large amount of damping is needed beyond what a single film damper is capable of providing so multi-film dampers are used.

However, the use of multi-film dampers with 3 or more oil films (layers) bring challenges related to mechanical integrity. Alternatives are thus desirable.

SUMMARY

In one aspect, the disclosure describes a dual-film damper in a gas turbine engine, comprising: a housing circumscribing an annular damper cavity around an axis and having an oil inlet connectable in flow communication with a source of pressurized oil; first and second damper rings coaxially nested within the annular damper cavity; a first pair of axially spaced-apart spacers radially between the first and second damper rings, the first pair of axially spaced-apart spacers creating a first oil film annulus between the first and second damper rings; and a second pair of axially spaced-apart spacers radially between the second damper ring and the housing, the second set of spacers creating a second oil film annulus between the second damper ring and the housing, the second oil film annulus surrounding the first oil film annulus; the first and second oil film annuli having a thickness-to-length ratio (T/L) ranging from 0.0025 to 0.03.

In a further aspect, the disclosure describes a dual-film damper for damping radial movement of a rotary shaft relative to a rotation axis, the dual-film damper comprising: a housing defining an oil damper cavity around the rotation axis; at most two coaxially nested damper rings including first and second damper rings disposed in the oil damper cavity; a first annulus radially between the first and second damper rings; a second annulus radially between the second damper ring and the housing, the second annulus encircling the first annulus; and a first and a second pair of axially spaced-apart piston rings projecting respectively radially across the first annulus and the second annulus, the first and second pairs of axially spaced-apart piston rings defining a thickness T and a length L of the first annulus and the second annulus, respectively; wherein a thickness-to-length ratio (T/L) ranges from 0.0053 to 0.025.

In accordance with a still further aspect, there is provided a dual-film damper for damping radial movement of a rotary shaft relative to a rotation axis, the dual-film damper comprising: a housing defining an oil damper cavity around the rotation axis; at most two damper rings including first and second damper rings disposed in the oil damper cavity, the second damper ring encircling the first damper ring; a first oil film annulus radially between the first and second damper rings; a second oil film annulus radially between the second damper ring and the housing; and first and second pairs of spacer rings respectively projecting radially across the first oil film annulus and the second oil film annulus, the first and second pairs of spacer rings respectively defining a thickness T and a length L of the first oil film annulus and the second oil film annulus, wherein L ranges from 1000 mils (25.4 mm) to 2000 mils (50.8 mm), wherein the thickness of the first oil film annulus ranges from 5 mils (0.127 mm) to 30 mils (0.762 mm), and wherein the thickness of the second oil film annulus ranges from 2.5 mils (0.051 mm) to 45 mils (1.143 mm).

DETAILED DESCRIPTION

Figure 1:
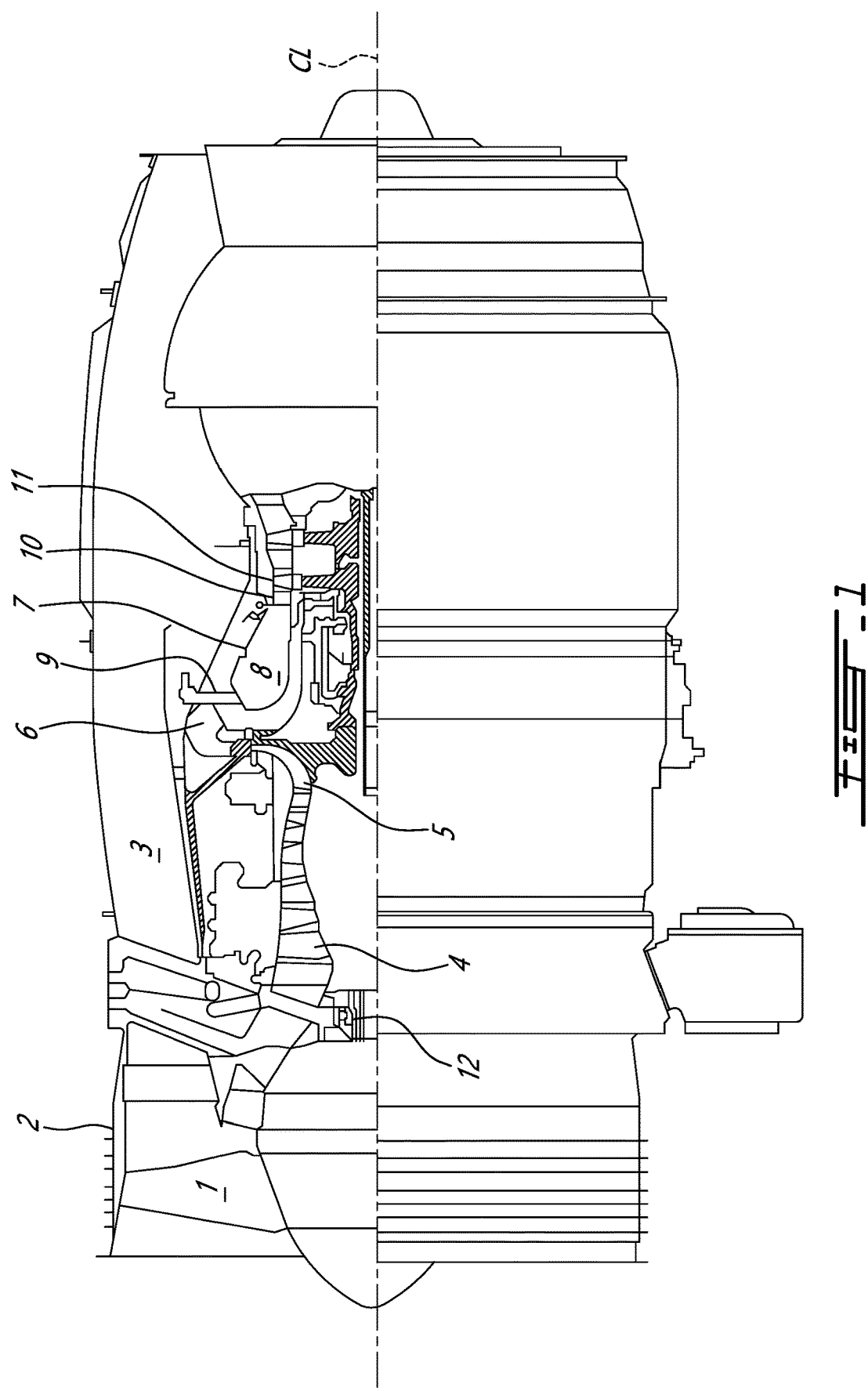
FIG. 1 shows an axial cross-section view of an exemplary turbofan engine including a dual-film damper.

FIG. 1 shows an axial cross-section through an example turbo-fan gas turbine engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

The engine 10 includes several rotor structures. For instance, the engine 10 can be provided in the form of a twin-spool engine comprising a low pressure spool and a high pressure spool mounted for rotation about the engine centerline CL. In use, such rotor structures are subject to vibrations, which needs to be dampened. In some applications, the amount of damping required is too large for a conventional single film damper. While multi-film dampers with three or more oil film layers could be used to provide additional damping, it has been found that the more multi-film layers are used, the more the dampers are vulnerable to structural issues. Such structural issues may lead to premature wear of the dampers and, thus, ultimately compromise the integrity of the rotor system. Applicant tests on multi-film dampers (3 or more layers) showed that high deflection associated with high unbalance causes damage on seals and damper rings which potentially leads premature failures in engine structure. Further investigations at test rig level showed that the high deflection also causes significant oil leak and aeration of the outer bearing race in multi-film configurations. It is thus suitable to minimize the number of oil film layers. The inventors have found that contrary to what could be expected, the damping capacity of a multi-film oil damper may be increased by increasing the oil thickness of the oil films within a predetermined range and by limiting the number of oil films/layers to two. As will be seen hereinafter with respect to some embodiments of a dual-film damper, an increase film thickness range and a film thickness-to-length ratio can be set to allow a dual-film damper to have a damping capacity comparable to multi-film dampers with 3 or more layers.

Figure 2:
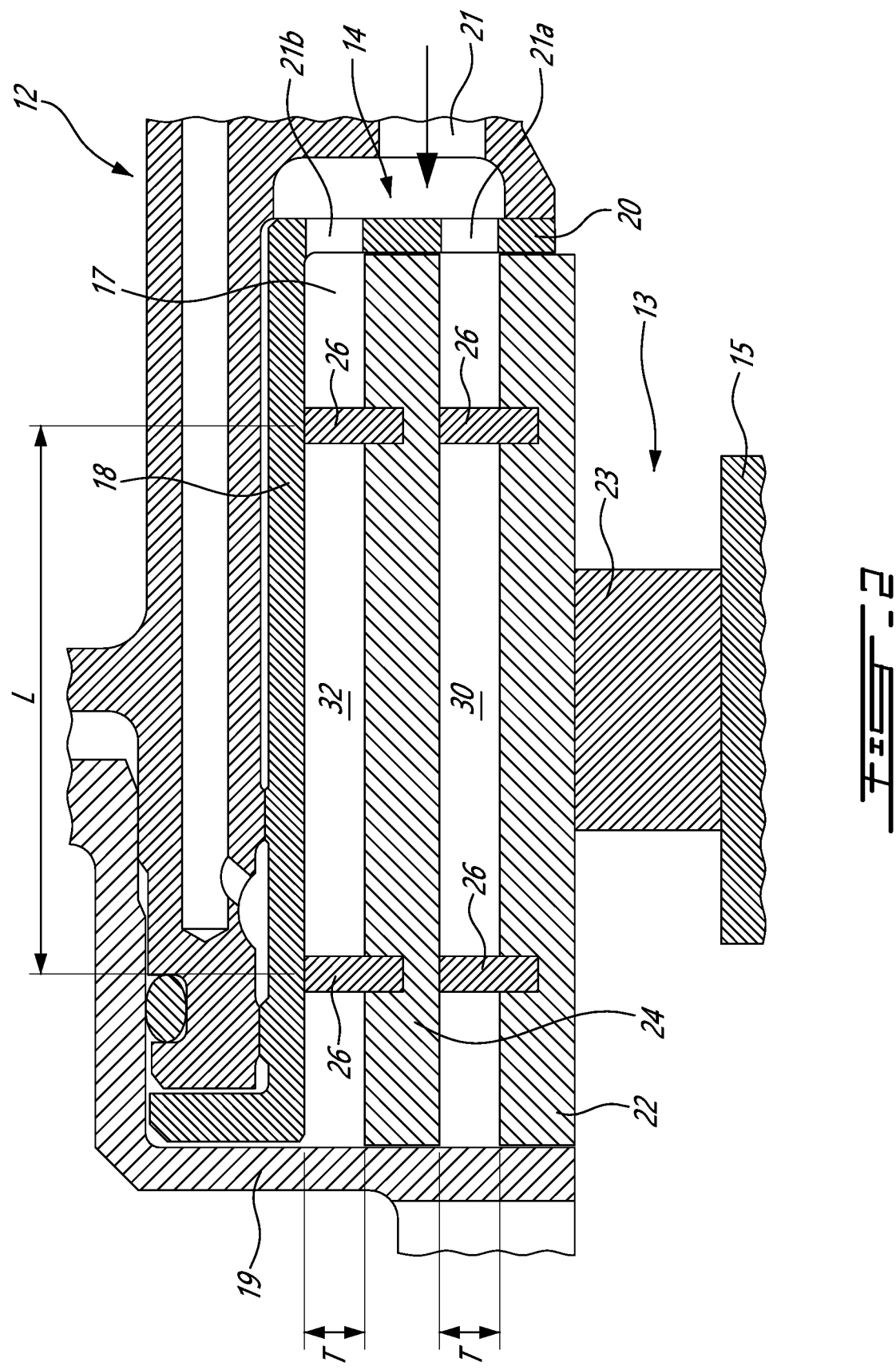
FIG. 2 is a schematic sectional view through an exemplary dual-large clearance film damper along an axial radial plane of the engine.

Now referring back to FIG. 1, there is shown a stationary forward bearing housing 12 that supports a low pressure spool shaft 15 (FIG. 2) with a roller bearing 13 (see FIG. 2). As can be appreciated from FIG. 2, the roller bearing 13 includes a dual-film damper 14. The dual-film damper 14 is provided to accommodate radial movement of the rotary shaft 15 relative to the stationary bearing housing 12. More particularly, the dual-film damper 14 provides damping to the low pressure spool shaft 15 to reduce vibrations. While the dual-film damper 14 is herein described in the context of a low pressure spool, it is understood that the dual-film damper 14 could be used in conjunction with other rotor systems (e.g. the high pressure spool) of the engine 10, the low pressure spool being only one possible application.

As shown in FIG. 2, the exemplified dual-film damper 14 includes an annular damper cavity 17 defined within the bearing housing 12 between a radially outward wall 18, a first radially extending side wall 19 and a second radially extending side wall 20. The damper cavity 17 has an oil inlet 21 fluidly connected to a source of pressurized oil, such as an engine oil circulating pump. According to an embodiment, the oil inlet 21 can include inlet openings 21a, 21b defined in the second side wall 20. However, it is understood that various oil supply arrangements could be used. The exemplified oil inlet 21 is provided for illustration purposes only.

Still referring to FIG. 2, the dual-damper 14 comprises at most two damper rings including a first and a second damper ring 22, 24 coaxially nested in the damper cavity 17 about shaft 15. The first damper ring 22, in the embodiment shown, serves both as an outer race for the rollers 23 of roller bearing 13 and to contain the pressurized oil within the damper cavity 17. The second and last damper ring 24 is disposed radially between the first damper ring 22 and the radially outward wall 18 of the bearing housing 12. The first and second damper rings 22, 24 extend axially between opposed axial ends. According to some embodiments, the first and second damper rings 22, 24 have a same axial length. The length of the two damper rings 22, 24 can generally correspond to that of the damper cavity 17. According to some embodiments, the opposed axial ends of the damper rings 22, 24 radially slidably sealed with the first and second radially extending side walls 19, 20 of the annular damper cavity 17 to contain the oil in the damper cavity 17.

Still referring to FIG. 2, a spacer 26 is disposed at each axial end portion of each damper ring 22, 24 (i.e. on opposed sides of a central/mid-point location along an axial length of the damper rings). According to some embodiments, the spacers 26 are provided in the form of removable spacer rings, such as piston rings, O-rings or the like removably mounted in corresponding annular grooves defined in the radially outer cylindrical surface of the first and second damper rings 22, 24. For instance, each spacer 26 can take the form of a metallic split ring attached to the outer diameter of a damper ring. Alternatively, the spacers 26 could be integrally formed with the damper rings 22, 24. For instance, the spacers could take the form of annular projections extending integrally from the inner and/or the outer radial surface of the damper rings 22, 24.

The spacers 26 serve to create first and second annuli 30, 32 that are filled with oil flow under pressure to thereby create a pair of coaxially nested oil film annuli in the damper cavity 17. The spacers 26 maintain a minimum space/clearance between the first and second damper rings 22, 24 and the second damper ring 24 and the end wall 18 of the housing 12. In other words, the spacers 26 set the thickness of the first and second oil film annuli 30, 32 in a radial direction relative to the engine centerline CL. According the illustrated embodiment, the first and second oil film annuli 30, 32 have a same thickness T. However, it is understood that the first and second oil film annuli 30, 32 could have a different thickness. According to some embodiments, the thickness T ranges from 8 mils to 25 mils (8 thousandth of an inch to 25 thousandth of an inch that is 0.203 mm to 0.635 mm). By so increasing the thickness of the annuli 30, 32 (i.e. the thickness of the oil films/layers) relative to the oil film thickness of conventional multi-film dampers, it is possible to obtain added damping capacity with a reduced number of oil films. With such an increase in clearance between the damper rings (i.e. increase in the radial thickness T of the nested oil film annuli), the damping capacity can be improved with only two oil film annuli. According to a further embodiment, the film damper is a dual film damper with two identical 16 mils (0.406 mm) oil film annuli (T=16 mils). According to other embodiments, the thickness T1 of the first oil film annuli 30 is comprised between 5 mils (0.127 mm) and 30 mils (0.762 mm), whereas the thickness T2 of the second oil film annuli 32 is between 2.5 mils (0.058 mm) and 45 mils 1.143 mm).

As shown in FIG. 2, the first and second oil film annuli 30, 32 have an axial length L generally corresponding to the center-to-center distance between respective pairs of spacers 26. According to the illustrated embodiment, the first and second oil film annuli 30, 32 have a same axial L. However, it is understood that the first and second oil film annuli 30, 32 could have a different length. According to some embodiments, the length L is between 1000 mils and 2000 mils (1 inch-1.5 inches) (25.4 mm and 50.8 mm). According to some applications, an optimum range for the Length L is comprised between 1000 mils (25.4 mm) and 1500 mils (38.1 mm).

According to some embodiments, damping capacity gains have been obtained with dual film dampers having a thickness-to-length ratio (T/L) ranging from 0.0025 to 0.03. For applications where the first and second oil film annuli 30, 32 have a same thickness T and a same length L, the thickness-to-length ratio can vary from 0.0053 to 0.025. For instance, the T/L ratio can be defined as follows:

L=1000 L=1500
T=8 0.008 0.0053
T=25 0.025 0.0166

For applications where the thickness T of the first and second oil film annuli 30, 32 have different boundary values, the thickness-to-length ratio of the first oil film annuli 30 can vary from 0.0025 to 0.03. For instance, the T/L ratio of the first oil film annuli 30 can be defined as follows:

L=1000 L=2000
T1=5 0.005 0.0025
T1=30 0.03 0.015

And the ratio of the thickness T1 of the first oil film annuli 30 to the thickness T2 of the second oil film annuli 32 (T1/T2) can range from 0.5 to 5.

Such relation between the thickest T and the length L of the first and second oil film annuli 30, 32 allows to increase the damping capacity compared to conventional single film dampers without being exposed to the adverse effects of high deflection as encountered with typical multi-film dampers with 3 or more damper rings. According to one embodiment, the first and second oil film annuli 30, 32 have a same thickness-to-length ratio. According to other embodiments, the first and second oil film annuli 30, 32 have a different thickness-to-length ratio.

In view of the foregoing, it can be appreciated that at least some of the above describes embodiments addresses some of the challenges relating to the mechanical integrity of multi-film dampers. According to at least some embodiments, the structural shortcomings of multi-film dampers are at least partly overcome through the use of a dual film damper with increase film clearance. For instance, the inventors have found that by having two films with a large oil film clearance (oil film increased thickness), damping capacity can be increased compared to a single film damper and that without being exposed to the adverse effects of high deflection in a typical multi-film damper design having 3 or more oil films (layers). The earlier multi-film damper designs do not introduce advantage of larger oil film clearance as a factor to increase damper capacity, hence mitigate the disadvantage of using limited number of films.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A dual-film damper in a gas turbine engine, comprising:
   a housing circumscribing an annular damper cavity around an axis and having an oil inlet connectable in flow communication with a source of pressurized oil;
   a first and a second damper ring coaxially nested within the annular damper cavity;
   a first pair of axially spaced-apart spacers positioned radially between the first and second damper rings, the first pair of axially spaced-apart spacers creating a first oil film annulus between the first and second damper rings; and
   a second pair of axially spaced-apart spacers radially between the second damper ring and the housing, the second set of spacers creating a second oil film annulus between the second damper ring and the housing, the second oil film annulus surrounding the first oil film annulus;
   each of the first and second oil film annuli having a thickness-to-length ratio (T/L) ranging from 0.0025 to 0.03.

2. The dual-film damper according to claim 1, wherein the first oil film annulus has a thickness T1, wherein the second oil film annulus has a thickness T2, and wherein T1/T2 is between 0.5 and 5.

3. The dual-film damper according to claim 2, wherein the thickness T1 of the first oil film annulus ranges from 5 mils (0.127 mm) to 30 mils (0.762 mm), and wherein the thickness T2 of the second oil film annulus ranges from 2.5 mils (0.0635 mm) to 45 mils (1.143 mm).

4. The dual-film damper according to claim 2, wherein the first and second oil film annuli have the same length (L).

5. The dual-film damper according to claim 1, wherein the thickness-to-length ratio (T/L) ranges from 0.0053 to 0.025.

6. The dual-film damper according to claim 1, wherein the first and second oil film annuli have the same thickness-to-length ratio (T/L).

7. The dual-film damper according to claim 1, wherein the first damper ring is an outer race of a bearing.

8. The dual-film damper according to claim 1, wherein the first and second oil film annuli have a length L ranging from 1000 mils (25.4 mm) to 1500 mils (38.1 mm) mm, and wherein the first and second oil film annuli have a thickness T ranging from 8 mils (0.203 mm) mm to 25 mils (0.635 mm).

9. The dual-film damper according to claim 1, wherein the first and second oil film annuli have a length L range from 1000 mils (25.4 mm) mm to 2000 mils (50.8 mm), wherein the first oil film annulus has a thickness T1 ranging from 5 mils (0.127 mm) to 30 mils (0.762 mm) and wherein the second oil film annulus has a thickness T2 ranging from 2.5 mils (0.063 mm) to 45 mils (1.143 mm).

10. A dual-film damper for damping radial movement of a rotary shaft relative to a rotation axis, the dual-film damper comprising:
    a housing defining an oil damper cavity around the rotation axis;
    at most two coaxially nested damper rings including first and second damper rings disposed in the oil damper cavity;
    a first annulus located radially between the first and second damper rings;
    a second annulus located radially between the second damper ring and the housing, the second annulus encircling the first annulus; and
    a first and a second pair of axially spaced-apart piston rings projecting respectively radially across the first annulus and the second annulus, the first and second pairs of axially spaced-apart piston rings defining a thickness T and a length L of the first annulus and the second annulus, respectively;
    wherein a thickness-to-length ratio (T/L) ranges from 0.0053 to 0.025.

11. The dual-film damper according to claim 10, wherein the length L ranges from 1000 mils (25.4 mm) to 1500 mils (38.1 mm), and wherein the thickness T ranges from 8 mils (0.203 mm) to 25 mils (0.635 mm).

12. The dual-film damper according to claim 11, wherein the first annulus and the second annulus have the same length L and the same thickness T.

13. The dual-film damper according to claim 12, wherein the thickness T is equal to 16 mils (0.406 mm).

14. The dual-film damper according to claim 10, wherein the first damper ring is an outer race of a bearing.

15. A dual-film damper for damping radial movement of a rotary shaft relative to a rotation axis, the dual-film damper comprising:
    a housing defining an oil damper cavity around the rotation axis;
    at most two damper rings including first and second damper rings disposed in the oil damper cavity, the second damper ring encircling the first damper ring;
    a first oil film annulus located radially between the first and second damper rings;
    a second oil film annulus located radially between the second damper ring and the housing; and
    a first and a second pair of spacer rings respectively projecting radially across the first oil film annulus and the second oil film annulus, the first and second pairs of spacer rings respectively defining a thickness T and a length L of the first oil film annulus and the second oil film annulus, wherein the length L ranges from 1000 mils (25.4 mm) to 2000 mils (50.8 mm), wherein the thickness T of the first oil film annulus ranges from 5 mils (0.127 mm) to 30 mils (0.762 mm), and wherein the thickness T of the second oil film annulus ranges from 2.5 mils (0.051 mm) to 45 mils (1.143 mm).

16. The dual-film damper according to claim 15, wherein the first oil film annulus has a first thickness T1, the second oil film annulus has a second thickness T2, and wherein T1/T2 is between 0.5 and 5.

17. The dual-film damper according to claim 15, wherein the first and second oil film annuli have a different thickness-to-length ratio (T/L).

18. The dual-film damper according to claim 15, wherein the first and second oil film annuli have the same length L.

19. The dual-film damper according to claim 15, wherein the first damper ring is an outer race of a bearing.

20. The dual-film damper according to claim 15, wherein the thickness T of the first oil film annulus is equal to the thickness of the second oil film annulus.

\* \* \* \* \*